United States Patent
Thoeny

(10) Patent No.: US 9,908,316 B1
(45) Date of Patent: Mar. 6, 2018

(54) FILM FOR BINDERS

(71) Applicant: American Profol Inc., Cedar Rapids, IA (US)

(72) Inventor: Mark Thoeny, Cedar Rapids, IA (US)

(73) Assignee: American Profol, Inc., Cedar Rapids, IA (US)

( * ) Notice: Subject to any disclaimer, the term of this patent is extended or adjusted under 35 U.S.C. 154(b) by 201 days.

(21) Appl. No.: 14/679,672

(22) Filed: Apr. 6, 2015

(51) Int. Cl.
*B32B 37/24* (2006.01)
*B32B 27/08* (2006.01)
*B32B 27/32* (2006.01)
*B32B 7/02* (2006.01)
*B32B 38/06* (2006.01)
*B32B 38/00* (2006.01)
*B32B 38/08* (2006.01)

(52) U.S. Cl.
CPC ............ *B32B 37/24* (2013.01); *B32B 7/02* (2013.01); *B32B 27/08* (2013.01); *B32B 27/32* (2013.01); *B32B 38/06* (2013.01); *B32B 38/08* (2013.01); *B32B 38/145* (2013.01); *B32B 2037/243* (2013.01); *B32B 2255/10* (2013.01); *B32B 2255/26* (2013.01); *B32B 2307/4023* (2013.01); *B32B 2307/4026* (2013.01); *B32B 2307/412* (2013.01)

(58) Field of Classification Search
CPC ......... B32B 27/08; B32B 27/32; B32B 38/14; B32B 38/145; B32B 2307/4023; B32B 2307/4026; B32B 2307/412; B42F 13/0006; B42F 13/0013
See application file for complete search history.

(56) References Cited

U.S. PATENT DOCUMENTS

| | | | |
|---|---|---|---|
| 2003/0024995 A1* | 2/2003 | Conner | G06K 19/044 235/492 |
| 2007/0264468 A1* | 11/2007 | Boyd | B32B 27/08 428/98 |
| 2009/0274879 A1* | 11/2009 | Priya | B32B 7/12 428/172 |

OTHER PUBLICATIONS

Translated Abstract of JP 2003-311869; published Nov. 6, 2003.*

* cited by examiner

*Primary Examiner* — Catherine A Simone
(74) *Attorney, Agent, or Firm* — Shuttleworth & Ingersoll, PLC; Brett Papendick

(57) ABSTRACT

A film for binders and a method for creating such a film are described. The film has a base film and a top film. A flood coating of colored ink is positioned between the base film and top film wherein the colored ink is protected from external forces to the binder. A sublayer of the base film has at least some opacity to prevent the paper board from being seen by an outside viewer.

3 Claims, 3 Drawing Sheets

FILM FOR BINDERS

BACKGROUND OF THE INVENTION

The conventional method for coating binders used to hold paper products such as loose-leaf binders and various other binders or folders leaves the coating susceptible to scratching and other forms of damage. In the case of binders which have been color coated or printed, the scratching of the coating can lead to viewing of the underlying paper board and/or damage to printed designs on the surface of the binder and/or paper board.

The conventional method utilizes the addition of pigment into the resin prior to extruding the colored film. Such a process does not lend itself to efficiently and cost-effectively produce relatively small quantities of colored film. Due in part to the economics, purchasers of colored film may be limited in color choices.

Therefore, it is an object of the invention to produce a coating or film for binders that is resilient to external forces that can damage the coating or film.

It is a further object of the invention to produce a coating or film for binders that can be customized and made in relatively small batches.

SUMMARY OF THE INVENTION

The present invention pertains to a film for binders and a process form making said film. This disclosure details several processes to make said film which protects colored ink and printed patterns. A colored or printed layer can be positioned in between a base film and a top film. The positioning of the colored or printed layer protects the color and print from external forces that may damage the color or print. Typically scratching of current binder film can lead to display of the paper board of the binder and/or the removal of portions of the color or printed design on the binder film.

Additionally, the base film can include an opaque layer which serves to assist in covering the actual paper board of the binder or to create a customized effect. The opaque layer can be white or can be colored. The top film can be embossed to add texture to the film which can be felt by the user of the binder.

DETAILED DESCRIPTION

The present invention provides a solution to place a colored and/or printed layer in between a base film and a top film wherein the film is utilized in connection with binders.

Figure 1:
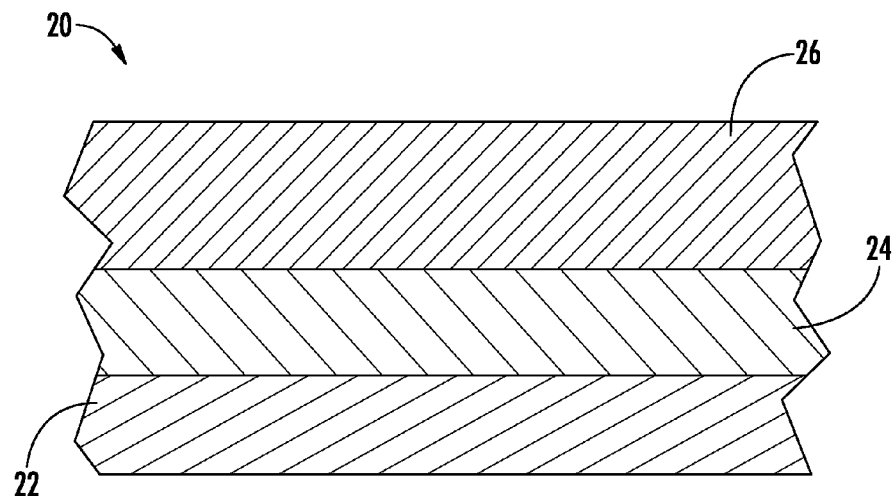
FIG. 1 is a cross-sectional view of a base film.

FIG. 1 illustrates a base film 20 of the preferred embodiment. The base film 20 has a first layer 22, a second layer 24, and a third layer 26. Although different thicknesses can be utilized, the base film preferably has an overall thickness of 1 to 5 thousands of an inch (mil). By percentages, the first layer 22 is approximately ten percent of the thickness, the second layer 24 is approximately eighty percent of the thickness, and the third layer 26 is approximately ten percent of the thickness. The first layer 22 is transparent or clear. The third layer 26 is also transparent or clear. The second layer 24 is 50-98 percent opaque, with the preferred color of the second layer 26 being white. The second layer 26 with its opacity prevents the paper board of the actual binder from being seen. A different color other than white can be utilized for the second layer 26 or the second layer 26 can also be clear in certain embodiments.

Figure 2:
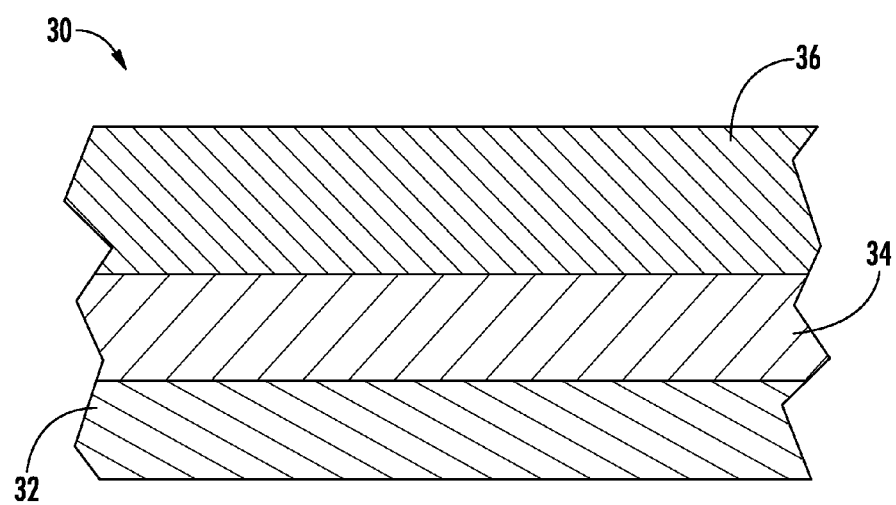
FIG. 2 is a cross-sectional view of a top film.

FIG. 2 illustrates a top film 30 of the preferred embodiment. The top film 30 has a first layer 32, a second layer 34, and a third layer 36. Although different thicknesses can be utilized, the top film preferably has an overall thickness of 0.5 and 2.5 thousands of an inch (mil). By percentages, the first layer 32 is approximately ten percent of the thickness, the second layer 34 is approximately eighty percent of the thickness, and the third layer 36 is approximately ten percent of the thickness. The first layer 32, the second layer 34, and the third layer 36 are transparent or clear.

A tinted layer 40 is positioned in between the base film 20 and top film 30. The following examples demonstrate how the tinted layer can be so positioned.

Example 1

Figure 3:
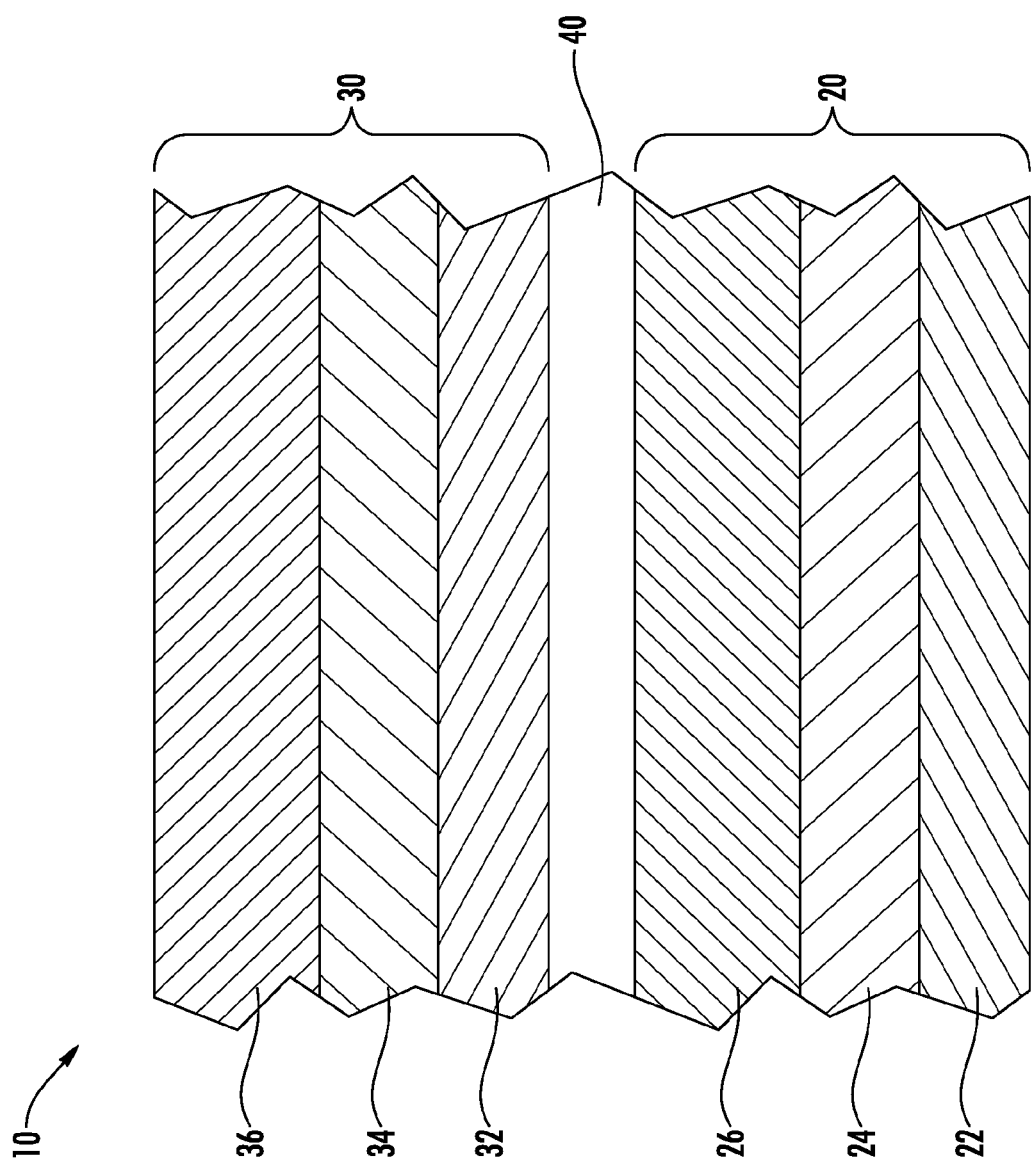
FIG. 3 is a cross-sectional view of a binder film.

As seen in FIG. 3, a film 10 comprises the base film 20, the top film 30, and a tinted layer 40. The base film has the first layer 22, second layer 24, and third layer 26 as described previously. The second layer 24 is white with an opacity of 50 to 98 percent. The base film is preferably a polyolefin of polypropylene or polyethylene. The layers of the base film are bound by utilizing a sufficient temperature during a casting process. Typically for polypropylene the temperature is between 220-260 degrees Celsius; whereas typically for polyethylene the temperature is between 170-210 degrees Celsius. The top film 30 has the first layer 32, the second layer 34, and the third layer 36 as previously described. The layers of the top film are bound the same as those in the base layer and can be polypropylene or polyethylene.

Either an exposed layer of the base film or an exposed layer of the top film is flood coated to produce the tinted layer 40. The flood coating produces the tinted layer 40. The base film 20 and the top film 30 are then positioned such that the tinted layer 40 is in between the base film 20 and the top film 30. The top film 30 is then laminated to the base film 20. The film 10 can then be applied to a binder.

Example 2

A second embodiment can be made by a similar process as in Example 1, however, the second layer 24 is flood coated with a color instead of being white.

Example 3

Figure 4:
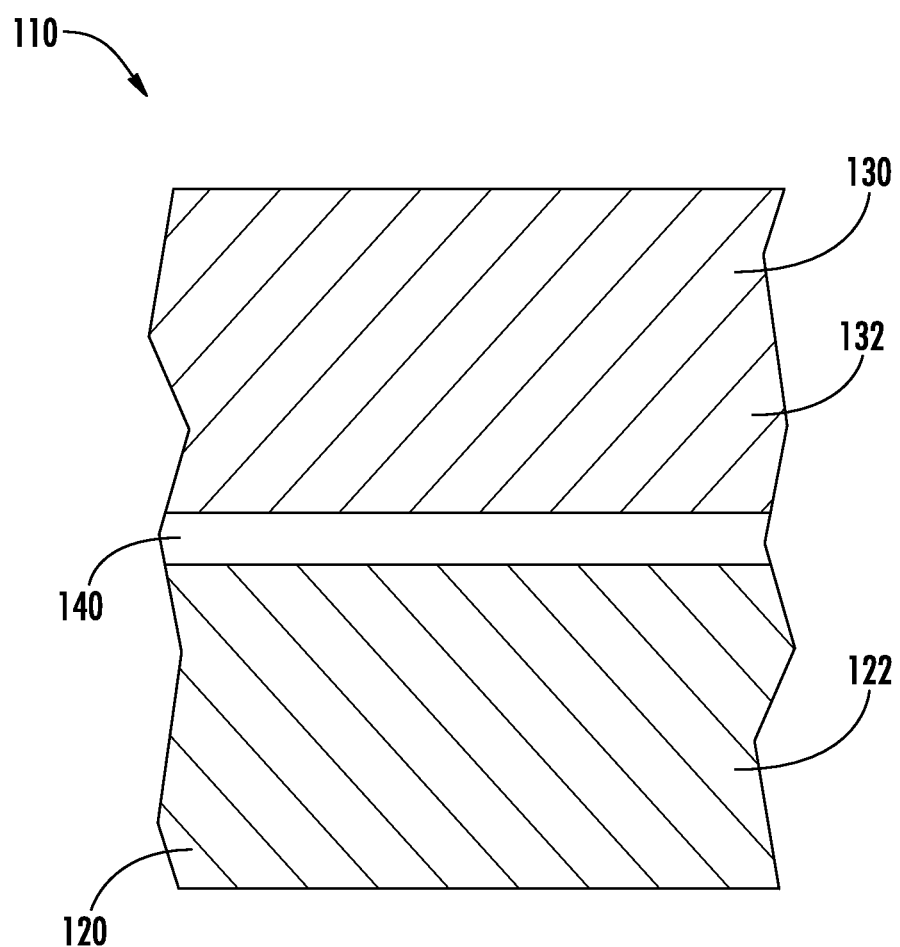
FIG. 4 is a cross-sectional view of a third embodiment of the binder film.

A third embodiment of a film binder 110 can be made by utilizing a base film 120 which is made of one layer 122 which can be white. The embodiment is shown in FIG. 4. A top film 130 can also have just one layer 132. Either an exposed layer of the base film 120 or an exposed layer of the top film 130 is flood coated to produce a tinted layer 140. The base film 120 and the top film 130 are then positioned such that the tinted layer 140 is in between the base film 120 and the top film 130. The top film 130 is then laminated to the base film 120.

In any of the above examples, an outside surface of the film 10 or 110 can be embossed by known means to create a texture. Similarly, a pattern can be printed on a surface captured in between a base film and top film. The pattern will also be protected by a top film of the embodiments.

Having thus described the invention in connection with the several embodiments thereof, it will be evident to those skilled in the art that various revisions can be made to the several embodiments described herein without departing from the spirit and scope of the invention. It is my intention, however, that all such revisions and modifications that are evident to those skilled in the art will be included with in the scope of the following claims. Any elements of any embodiments disclosed herein can be used in combination with any elements of other embodiments disclosed herein in any manner to create different embodiments.

What is claimed is:

1. A film for a binder, comprising:
a base film;
the base film having a first layer;
the first layer of the base film is transparent;
the base film having a second layer;
the second layer of the base film is colored;
the base layer having a third layer;
the third layer of the base film is transparent;
a tinted layer adjacent the third layer of the base film;
a top film;
the top film having a first layer;
the first layer of the top film is transparent;
the top film having a second layer;
the second layer of the top film is transparent;
the top film having a third layer;
the third layer of the top film is transparent;
the tinted layer between the base film and the top film wherein the tinted layer is protected from external forces;
the top film is polyethylene;
the base film is polyethylene;
the top film has a thickness between 0.5 and 2.5 mil;
the base film has a thickness between 1 to 5 mil;
the second layer of the base film is white;
the top layer is embossed;
the second layer of the base film has an opacity between 50 and 98 percent.

2. The film of claim 1, wherein:
the tinted layer is an ink that has been flood coated on the base layer.

3. A film for a binder, comprising:
a base film;
the base film having a first layer;
the first layer of the base film is transparent;
the base film having a second layer;
the second layer of the base film is colored;
the base layer having a third layer;
the third layer of the base film is transparent;
a tinted layer adjacent the third layer of the base film;
a top film;
the top film having a first layer;
the first layer of the top film is transparent;
the top film having a second layer;
the second layer of the top film is transparent;
the top film having a third layer;
the third layer of the top film is transparent;
the tinted layer between the base film and the top film wherein the tinted layer is protected from external forces;
the base film made from one of polypropylene and polyethylene;
the top film made from one of polypropylene and polyethylene;
the top film has a thickness between 0.5 and 2.5 mil;
the base film has a thickness between 1 to 5 mil;
the second layer of the base film is white;
the top layer is embossed;
the second layer of the base film has an opacity between 50 and 98 percent.

* * * * *